C. G. KOPPITZ.
MEANS FOR TRANSFERRING HIGH POTENTIAL ELECTRIC CURRENTS IN PARALLEL EQUAL ARCS.
APPLICATION FILED SEPT. 19, 1913.

1,183,882.

Patented May 23, 1916.

Witnesses
R. J. Hulsizer.
C. H. Potter.

Inventor
Carl G. Koppitz,
by Byrnes, Townsend & Brickenstein,
Attorneys.

UNITED STATES PATENT OFFICE.

CARL G. KOPPITZ, OF WILKINSBURG, PENNSYLVANIA.

MEANS FOR TRANSFERRING HIGH-POTENTIAL ELECTRIC CURRENTS IN PARALLEL EQUAL ARCS.

1,183,882. Specification of Letters Patent. Patented May 23, 1916.

Application filed September 19, 1913. Serial No. 790,772.

*To all whom it may concern:*

Be it known that I, CARL G. KOPPITZ, a citizen of the United States, residing at Wilkinsburg, in the county of Allegheny and State of Pennsylvania, have invented certain new and useful Improvements in Means for Transferring High-Potential Electric Currents in Parallel Equal Arcs, of which the following is a specification.

In my applications Serial Number 646,988, filed August 31, 1911, and 724,963 filed October 10, 1912, I have described a process of and apparatus for interconverting direct and alternating currents, having a potential of from one or two thousand up to several hundred thousand volts, by synchronously transferring unidirectional currents as arcs between rotating distributers connected to the source of direct current and fixed commutator-segments connected by spaced leads to different portions of a closed alternating-current winding, the distributers being driven in synchronism with the alternating-current phases.

My application Serial No. 743,399, filed January 21, 1913, also illustrates a converter having two sets of alternating-current windings, the spaced leads from which extend to adjacent terminals, or to terminals opposed by revolving terminals of like sign, so that two currents are simultaneously transferred in parallel arcs, thereby increasing the capacity of the machine, operating with a suitable current-density at each terminal.

The present invention relates to means for causing such multiple arcs described in my application Serial No. 743,399 to strike simultaneously, and for maintaining them equal until interrupted. The preferred means consists of pairs of coils, wound, in inductive relation, on a magnetizable core, and interposed in the parallel circuits which carry simultaneous currents.

Figure 1:
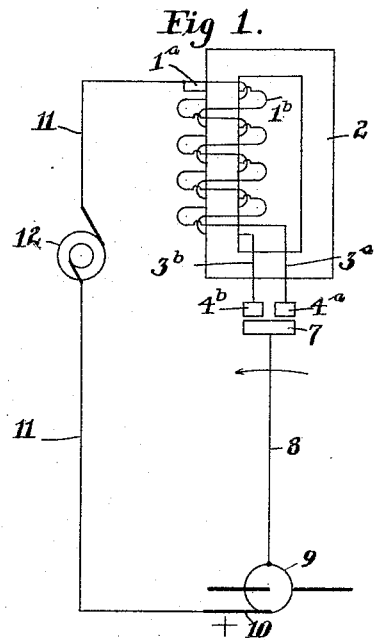
Figure 2:
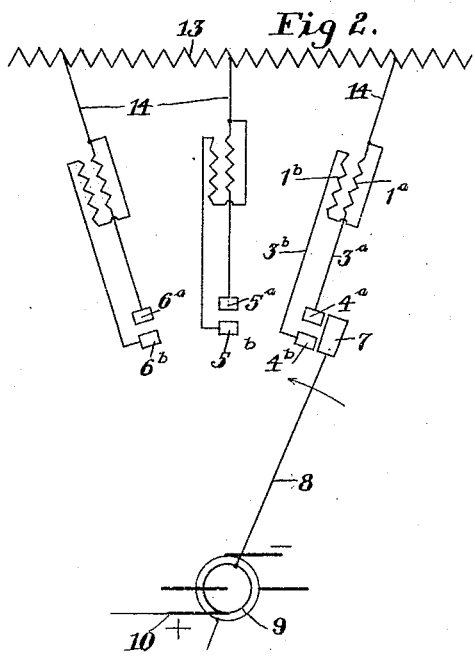
Figure 3:
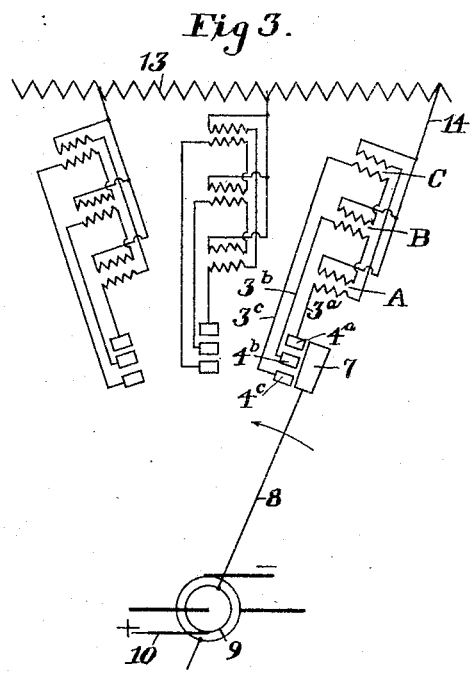
Figure 4:
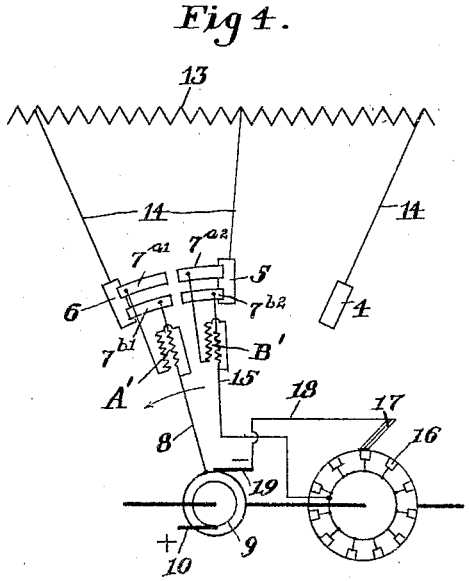

Referring to the accompanying drawing—Figure 1 is a diagrammatic view of an elementary apparatus, illustrating the principle of the invention; Fig. 2 is a diagrammatic view of a portion of a converter employing duplicate fixed alternating-current terminals, with equalizing coils, opposed by a single rotating direct-current terminal; Fig. 3 is a diagrammatic view of a portion of a converter employing triplicate fixed alternating-current terminals, with equalizing coils, opposed by a single rotating direct-current terminal; and Fig. 4 is a diagrammatic view of a converter employing single fixed alternating-current terminals opposed by duplicate rotating direct-current terminals, with equalizing coils; also duplicate auxiliary rotating terminals with equalizing coils and an arc-interrupter.

In the elementary apparatus of Fig. 1, two equalizing coils $1^a$ and $1^b$ are wound in opposition, with an equal number of turns, on a transformer-core 2. Parallel, or subdivided leads $3^a$, $3^b$ extend from these coils to fixed terminals $4^a$, $4^b$, respectively. A single long terminal 7 is arranged to rotate in proximity to the terminals $4^a$, $4^b$, so that two arcs will simultaneously strike across the air-gaps. Terminal 7 is connected by a lead 8 to a slip-ring 9, on which bears a brush 10 completing the circuit 11 of the alternating-current generator 12. These coils cause arcs to simultaneously strike from the terminals $4^a$, $4^b$ to terminal 7, since if current first starts to flow through one coil only, it induces a current of equal voltage but opposite direction in the other coil; but since the coils are wound in opposition, the induced E. M. F. is added to the impressed E. M. F., and the voltage is thereby raised to a point which at once causes an arc to strike at the second terminal. These coils also maintain the two arcs equal, during the short period of their flow, for if a greater current flows through one of the windings, the core is magnetized thereby, and the counter E. M. F. due to self-induction at once cuts down the current until the same current is flowing in both coils and the magnetism of the core is thereby reduced to a minimum.

Fig. 2 illustrates a portion of a converter such as is described in my other specified applications, the winding 13 being a part of a closed three-phase or other alternating-current winding, from which spaced leads 14 extend to fixed terminals, the terminals of a direct-current distributer rotating in arcing proximity thereto. According to the present invention, duplicate fixed terminals, connected, through equalizing coils, to the same lead, are employed. Three sets of such duplicate terminals $4^a$, $4^b$; $5^a$, $5^b$, and $6^a$, $6^b$, are shown, having parallel connections $3^a$, $3^b$ to the equalizing coils $1^a$, $1^b$, which are connected in parallel to each lead 14. The positive direct-current terminal 7 is arranged to rotate in arcing proximity to each pair of fixed terminals, being connected by a lead 8 to a slip-ring 9 on which bears the positive brush 10.

Fig. 3 illustrates a converter like that of Fig. 2, except that triplicate terminals $4^a$, $4^b$, $4^c$, etc., are employed, having parallel connections $3^a$, $3^b$, $3^c$, to three sets of equalizing coils A, B, C connected in parallel to each lead 14. The operation of this converter is very similar to that of Fig. 2. However, when more than two parallel arcs are used, one set of equalizing coils is required for each arc terminal, therefore requiring three sets for the three terminals here shown. The current to each arc traverses two coils in series, but of different sets. The two opposing coils forming a set, for example A, have an equal number of turns and are in inductive relation to each other, but not to the coils of sets B or C. In case the current to terminal $4^a$ should increase above that of the others, the neutralization of opposing currents in sets A and C will be disturbed, and to reëstablish equilibrium, the currents in the opposing coils of each set must be increased to the same value as that flowing through terminal $4^a$. The current through terminal $4^b$, passing through the opposing coil of set A, and the current through terminals $4^c$, having the opposing coil of set C in circuit, are thereby brought to the same value as that flowing through $4^a$. The two currents through terminals $4^b$ and $4^c$, respectively, which have just been modified to correspond to that through terminal $4^a$, are further subject to the action of the opposing coils of set B, tending to equalize them. This cycle of operation will follow in like manner but with different coils when the current through any one of the other terminals tends to change to a different value from the remainder.

Fig. 4 shows a converter employing a series of single fixed alternating-current terminals 4, 5, 6, opposed by duplicate rotating direct-current terminals $7^{a1}$, $7^{b1}$, connected in parallel, through equalizing coils A', to the lead 8. Duplicate auxiliary rotating direct-current terminals $7^{a2}$, $7^{b2}$ are also illustrated, placed immediately behind the first pair and connected in parallel through equalizing coils B', lead 15, an interrupter 16 having brush 17, and lead 18 to the negative brush 19 of the converter.

I claim:—

1. Means for transferring high-potential electric currents in parallel equal arcs, comprising a conductor subdivided into parallel circuits, each circuit provided with an arcing-block, a single terminal in arcing proximity to the arcing-blocks of said conductor, said arcing-blocks and terminal being relatively revoluble, and means for equalizing the simultaneous currents in said parallel circuits.

2. Means for transferring high-potential electric currents in parallel equal arcs, comprising a conductor subdivided into parallel circuits, each circuit provided with an arcing-block, a single terminal in arcing proximity to the arcing-blocks of said conductor, said arcing-blocks and terminal being relatively revoluble, and means for equalizing the simultaneous currents in said parallel circuits, consisting of a pair or pairs of coils wound in opposition, the coils of one pair being in different parallel circuits and in inductive relation.

3. Means for transferring high-potential electric currents in parallel equal arcs, comprising a conductor subdivided into parallel circuits, each circuit provided with an arcing-block, a single terminal in arcing proximity to the arcing-blocks of said conductor, said arcing-blocks and terminal being relatively revoluble, and means for equalizing the simultaneous currents in said parallel circuits, consisting of a pair or pairs of coils wound in opposition, a magnetizable core surrounded by a pair of said coils, the separate coils of one pair being in different parallel circuits and in inductive relation.

4. A converter for high-potential electric currents, consisting of an alternating current winding, spaced leads extending from said winding, a direct current distributer, and alternating- and direct-current terminals connected respectively to the leads and distributer arranged in arcing proximity to each other and relatively revoluble, a portion of the terminals consisting of plural members terminating parallel circuits, a single relatively-revoluble terminal being opposed thereto, and means for equalizing the simultaneous currents in said parallel circuits, consisting of a pair or pairs of coils wound in opposition, a magnetizable core surrounded by a pair of said coils, the separate coils of one pair being in different parallel circuits and in inductive relation.

In testimony whereof I affix my signature in presence of two witnesses.

CARL G. KOPPITZ.

Witnesses:
 ALICE A. TRILL,
 F. B. JOYCE.